(No Model.)
T. W. WELSH.
PRESSURE GAGE.
No. 552,653.　　　　　　　　Patented Jan. 7, 1896.
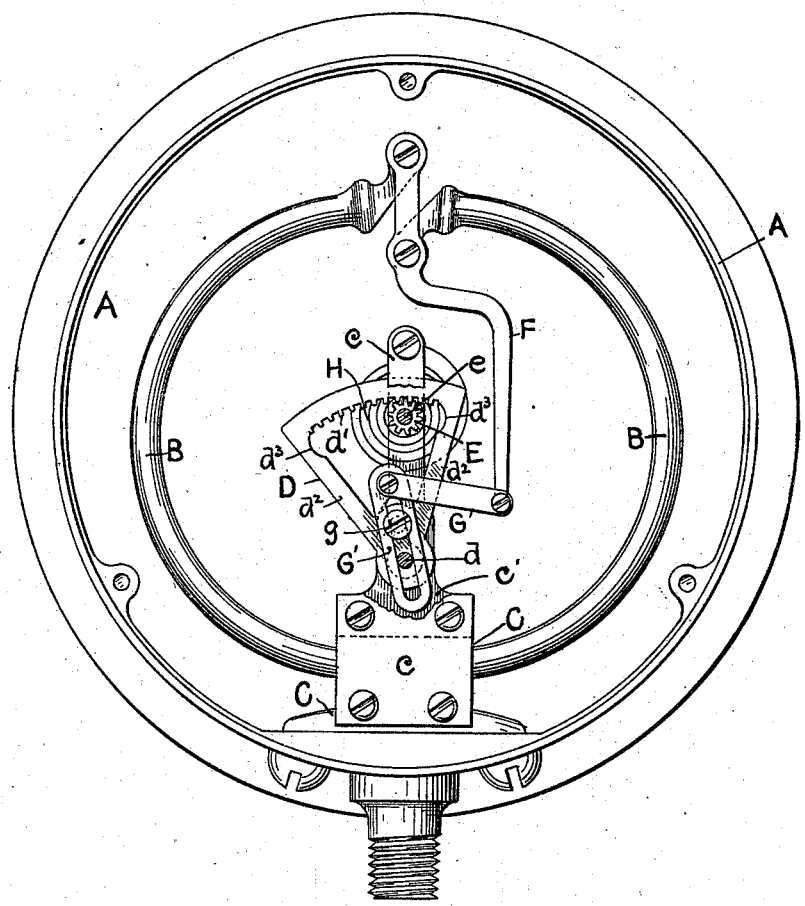
WITNESSES:
Chas. Hanrmann
Edwn Salisbury Jones.
Thomas W. Welsh
INVENTOR
BY
Chas. W. Forbes
ATTORNEY

UNITED STATES PATENT OFFICE.

THOMAS W. WELSH, OF WILMERDING, PENNSYLVANIA, ASSIGNOR TO THE ASHCROFT MANUFACTURING COMPANY, OF BRIDGEPORT, CONNECTICUT.

PRESSURE-GAGE.

SPECIFICATION forming part of Letters Patent No. 552,653, dated January 7, 1896.

Application filed April 17, 1895. Serial No. 546,001. (No model.)

*To all whom it may concern:*

Be it known that I, THOMAS W. WELSH, a citizen of the United States, residing in Wilmerding, county of Allegheny, and State of Pennsylvania, have invented a new and useful Improvement in Pressure-Gages, of which the following is a specification.

This invention relates to that variety of pressure-gages in which a toothed sector-arm is employed that is pivoted at its lower end, and meshes at its upper end with a pinion, the shaft of which carries the index-hand, the said arm being connected by a link and lever to the expansion-tube or pressure device of the gage, so as to transmit the motion of said device to the index-hand. In such gages, as far as I am aware, the teeth on the sector-arm have been located upon its peripheral arc surface and have engaged the pinion on the under side of the latter. When such gages are used upon locomotives, where the jar or vibration of the parts is excessive, the gradual wear upon the bearings of the sector-arm causes it to sink by gravity so that the meshing of its teeth with those of the pinion becomes imperfect, and consequent defective indication results. In such gages, also, a sudden and considerable change in the pressure (as of the air in air-brake mechanism) is liable to cause the sector-arm to swing so far as to disengage it from the pinion, when the gage becomes worthless until a proper adjustment of the sector-arm with relation to the pinion has been effected again.

The objects of the invention are so to combine the sector-arm with the pinion that any lowering of the former by wear will cause its teeth to come into more intimate contact with the pinion, so that correct indication will be preserved, and by locating the pinion within the boundary of the skeleton sector-arm to enable the diverging arms of the sector to act as stops to prevent the sector from disengagement with the pinion, as hereinafter set forth.

In the accompanying drawing a front view of a pressure-gage embodying the improvement is shown, the dial and registering-hand being removed and the pinion-shaft and sector-arm shaft being shown in transverse section.

A indicates the body or frame of the gage. B B are expansion-tubes of the Bourdon type. C is the hollow standard with which said tubes are connected. $c$ $c'$ are plates secured to said standard and projecting upwardly therefrom, in which plates the shaft $d$ of the sector-arm D and the shaft $e$ of the pinion E have their bearings. F is the lever and G G' the links which connect the lever with said arm, a screw $g$ fastening the latter link to the arm, and H is the retractile spring, one end of which is secured in a stationary position, while the other end is attached to the shaft $e$, as usual.

As shown in the drawing, the arm D is of skeleton form and has its shaft $d$ located at its lower end. The teeth $d'$ on the arm project downwardly from the inner arc surface of the arm and engage the pinion upon the upper side of the latter. Any wear upon the shaft $d$ or its bearings, and consequent lowering by gravity of the arm D, therefore, will bring the teeth $d'$ into more intimate contact with those on the pinion and insure a continued perfect indication. It will be seen, also, that the pinion E is located within the boundary of the sector D, so that the diverging arms $d^2$ of the latter will act as stops against the pinion to prevent a disengagement of the sector and pinion under sudden and considerable changes in pressure. Preferably the arms $d^2$ are cut away at $d^3$ or bowed out at such points to allow of the desired movements of the sector without increasing the length of its arc portion.

What I claim as my invention, and desire to secure by Letters Patent, is—

1. In a pressure gage having an expansion tube or device connected with a sector arm which is geared with an index pinion, said sector arm being pivoted below said index pinion, to obtain a longer link connection with the expansion tube, and constructed with its gear teeth arranged on its inner arc surface and meshing with the teeth on the upper side of the index pinion so that wear upon the pivoted parts will maintain the gear teeth in constant close contact substantially as described.

2. The combination with the index-hand pinion, of the sector-arm inclosing the pinion and meshing with the upper surface of the latter, and having its side-arms cut away or bowed, at $d^3$, substantially as and for the purpose specified.

THOMAS W. WELSH.

Witnesses:
L. E. LOVE,
H. H. WELSH, Jr.